United States Patent [19]

Belser et al.

[11] Patent Number: 5,666,325

[45] Date of Patent: Sep. 9, 1997

[54] METHOD AND APPARATUS FOR MONITORING AND CONTROLLING THE DISPENSING OF MATERIALS ONTO A SUBSTRATE

[75] Inventors: Robert S. Belser, Bay Village; Kamal Kumar, Lorain, both of Ohio

[73] Assignee: Nordson Corporation, Westlake, Ohio

[21] Appl. No.: 509,132

[22] Filed: Jul. 31, 1995

[51] Int. Cl.$^6$ ................................................. G01S 15/00
[52] U.S. Cl. ..................... 367/95; 367/96; 367/99; 340/686; 340/612; 364/479.01; 141/1; 427/8; 427/9; 73/597; 73/598
[58] Field of Search ..................... 367/93, 95, 96, 367/97, 99, 908; 340/636, 612; 356/391, 3, 5.09; 141/1, 94, 198; 427/8, 9, 10; 364/479, 478, 468; 73/290 R, 150 R, 865.5, 597, 598

[56] References Cited

U.S. PATENT DOCUMENTS

| | | | |
|---|---|---|---|
| 4,326,155 | 4/1982 | Griebeler | 318/576 |
| 4,360,308 | 11/1982 | Gifford et al. | 414/572 |
| 4,367,244 | 1/1983 | Holmes | 427/8 |
| 4,459,526 | 7/1984 | Griebeler | 318/576 |
| 4,500,977 | 2/1985 | Gelhard | 367/108 |
| 4,532,723 | 8/1985 | Kellie et al. | 356/73 |
| 4,674,057 | 6/1987 | Caughman et al. | 395/93 |
| 4,724,302 | 2/1988 | Penney et al. | 219/130.21 |
| 4,823,366 | 4/1989 | Williams | 377/2 |
| 4,854,698 | 8/1989 | Schmidt | 356/5.03 |
| 4,887,248 | 12/1989 | Griebeler | 367/131 |
| 4,895,441 | 1/1990 | Allen, Jr. | 356/5.09 |
| 4,905,512 | 3/1990 | Hayashi | 73/169 |
| 5,024,529 | 6/1991 | Svetkoff et al. | 356/376 |
| 5,026,989 | 6/1991 | Merkel | 250/338.1 |
| 5,036,892 | 8/1991 | Stembridge et al. | 141/1 |
| 5,150,334 | 9/1992 | Crosby | 367/98 |
| 5,220,536 | 6/1993 | Stringer et al. | 367/99 |
| 5,319,974 | 6/1994 | Lenz et al. | 73/290 V |
| 5,322,706 | 6/1994 | Merkel et al. | 427/8 |
| 5,345,939 | 9/1994 | Engeler et al. | 128/661.01 |
| 5,402,351 | 3/1995 | Batchelder et al. | 364/468.26 |
| 5,540,946 | 7/1996 | DeVries et al. | 427/8 |

FOREIGN PATENT DOCUMENTS 4-323028   3/1992   Japan.

OTHER PUBLICATIONS

Cleveland Machine Controls, Inc. specification re PULSONIC "Sonic Laser", Noncontact Measurement System.

Primary Examiner—Jeffery Hofsass
Assistant Examiner—Benjamin C. Lee
Attorney, Agent, or Firm—Renner, Kenner, Greive, Bobak, Taylor & Weber

[57] ABSTRACT

A dispensing system includes a robot that controls the positional location of a dispenser that dispenses a bead of material, such an adhesive, onto a substrate and wherein a sensor monitors the geometric configuration of the material dispensed. The dispensing system also includes a control circuit which receives information from the sensor so as to monitor geometric characteristics such as height, width and cross sectional area in such a manner that statistical process data can be gathered and also to provide alarm indications whenever the height or width of the bead do not comply with predetermined characteristics. The control circuit also provides a closed loop feedback system so that the supply of material and the nozzle can be controlled in such a manner to modify the flow of bead material whenever a discrepancy or error is detected by the control circuit.

16 Claims, 3 Drawing Sheets

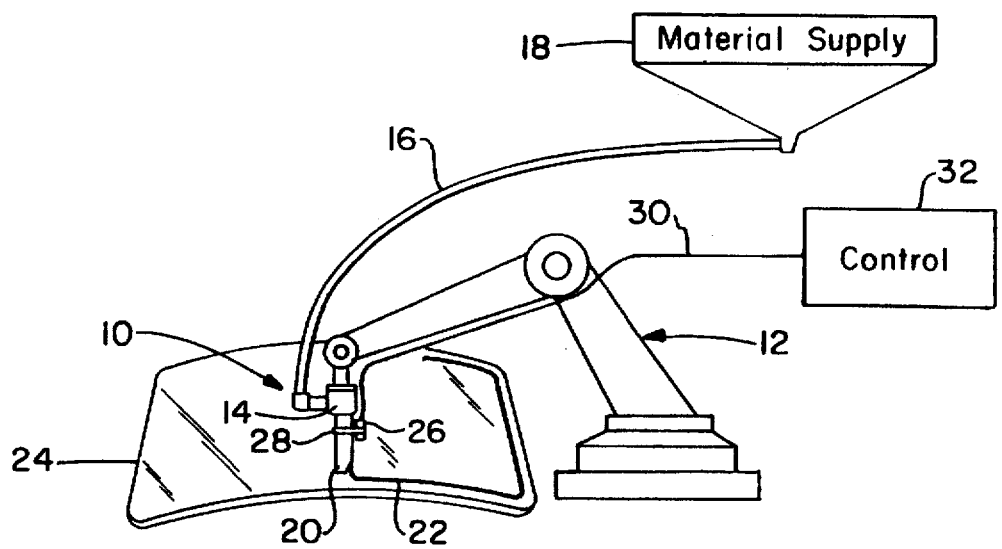
FIG.-1
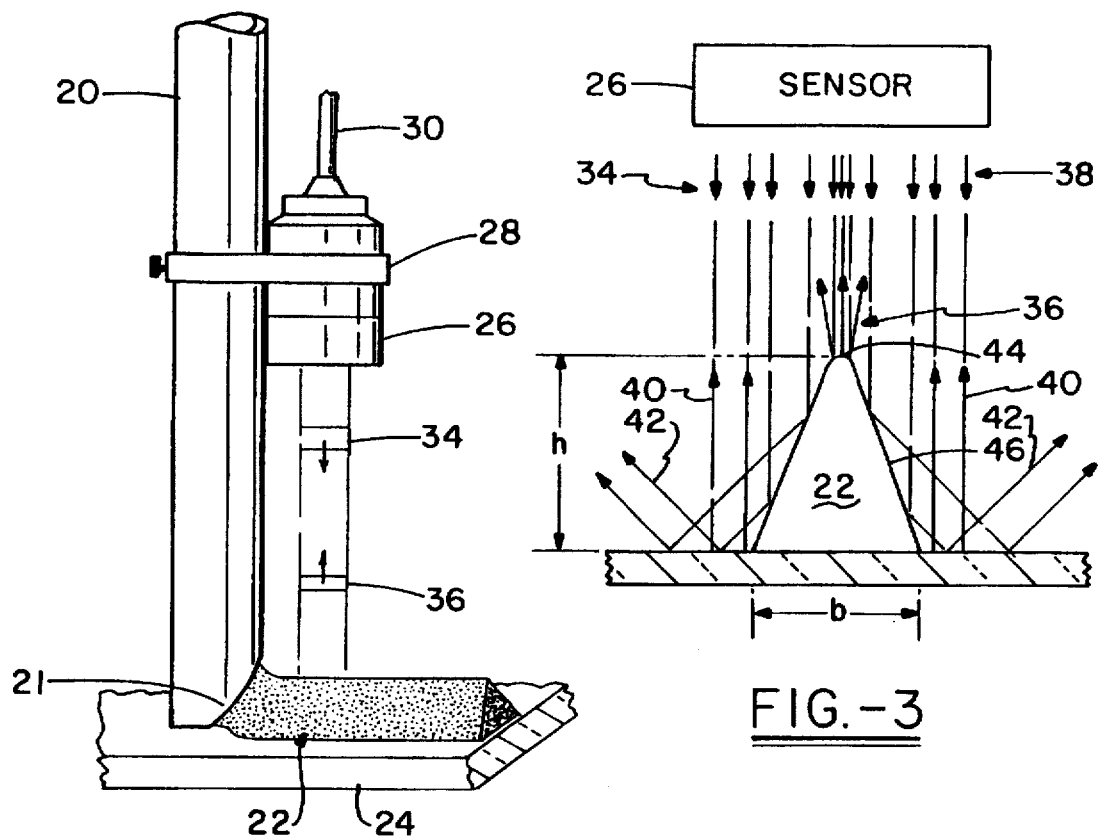
FIG.-2
FIG.-3

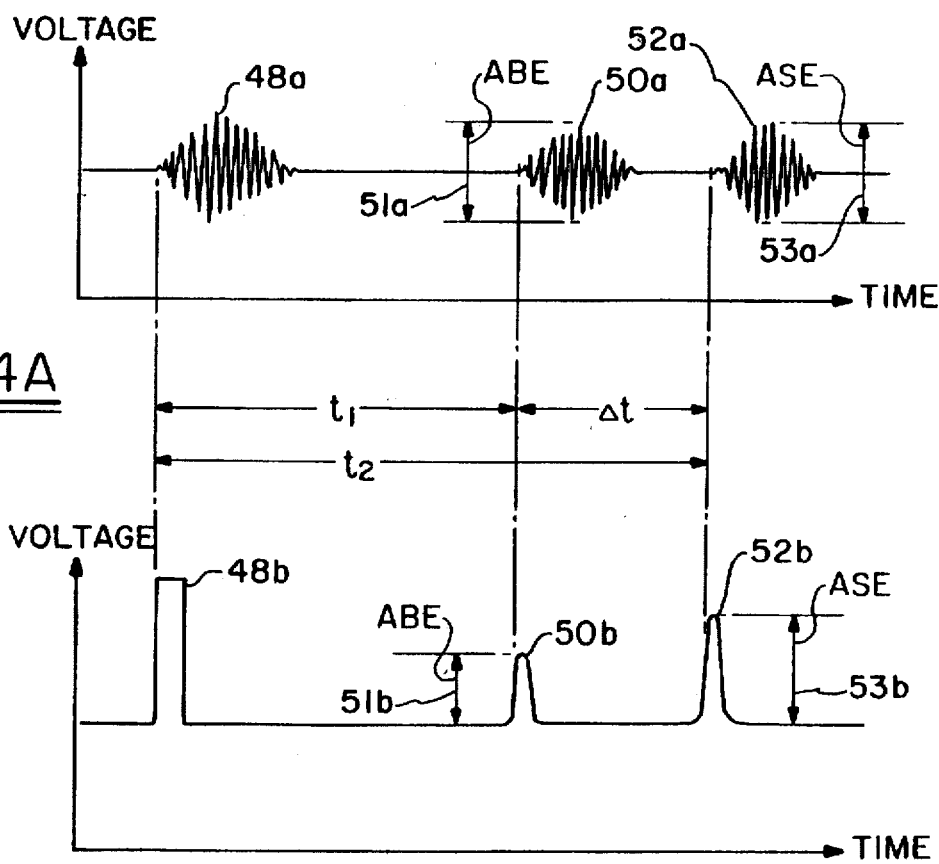
FIG.-4A
FIG.-4B
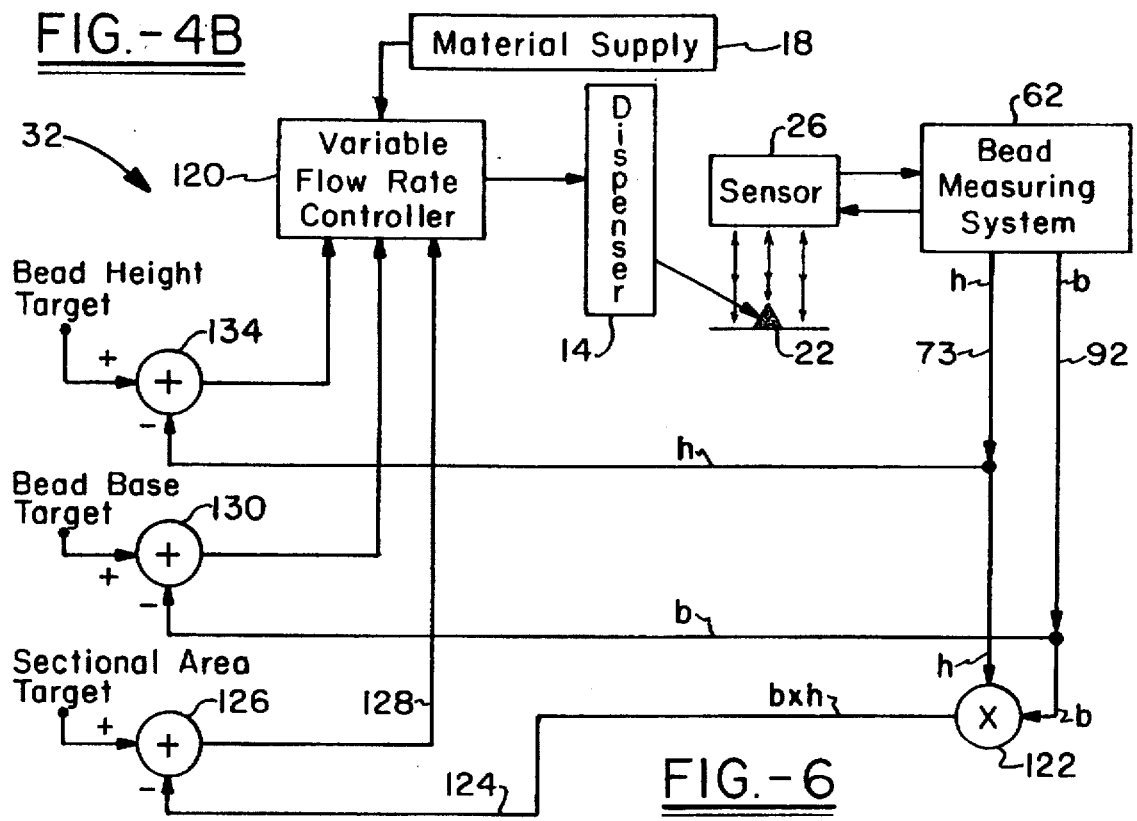
FIG.-6

METHOD AND APPARATUS FOR MONITORING AND CONTROLLING THE DISPENSING OF MATERIALS ONTO A SUBSTRATE

TECHNICAL FIELD

The invention herein resides in the art of material dispensing systems which monitor and control the characteristics of the bead of material being dispensed. More particularly, the present invention relates to a sensor which transmits and receives sound waves to determine the height and width of material that has been dispensed. Specifically, the present invention relates to a dispensing system with a closed loop feedback control for adjusting the dispensing flow of the material based upon bead characteristics monitored by a sensor.

BACKGROUND OF THE INVENTION

This invention relates generally to the dispensing of fluid materials onto substrates. More particularly, the invention relates to the detection and/or monitoring of a bead of material which has been deposited onto a substrate. Specifically, this invention is applicable to the detection of the presence of discontinuities associated with a deposited bead of material, such as, for example, a bead of an adhesive, sealant, or caulk, as well as determining other qualities of the deposited bead, such as its height, cross-section, or the amount of material that has been dispensed. This invention is especially useful in the monitoring of a bead of material dispensed onto the periphery of window glass, such as a windshield in preparation for adhesively bonding the glass to the body flange of a vehicle.

The presence of an air bubble passing through a nozzle of a dispensing system or a reduction in the material supply pressure may cause a disruption in the flow rate of material being dispensed so as to produce a discontinuity or deformation in the bead deposited upon the substrate. If the air bubble or the reduction in the material supply pressure or flow rate is small, the effect on the resulting bead may be minimal. However, if the air bubble is large or the material supply pressure is insufficient, the effect may produce a significant discontinuity in the bead, or a bead having an insufficient height or cross-section. In some applications, discontinuities in the bead may not be critical, however, in others they may be. For example, discontinuities in a bead of the adhesive/sealant applied to a windshield may not only affect its ability to act as a moisture barrier, but it also may affect the strength of the bond of the windshield in the vehicle.

Attempts have been made to detect gaps in dispensed beads automatically as opposed to an operator's visual inspection. This has included monitoring pressure fluctuation within the system as set forth in U.S. Pat. Nos. 4,662, 540 and 5,182,938, as well as monitoring the vibration of the dispenser, such as set forth in U.S. Pat. No. 5,086,640. These patents attempt to detect a discontinuity in the bead before the bead is actually deposited onto the substrate. They only infer that a discontinuity has occurred, as opposed to verifying that a discontinuity has actually occurred in the deposited bead.

Although not in the assembly of automobile glass, sensors have been used to monitor energy radiating from the deposited bead by utilizing an infrared sensor, such as shown in U.S. Pat. No. 5,026,989. However, this device must be used with a heated adhesive, such as a hot melt adhesive. It therefore would not be useful with room temperature adhesives commonly used in the automotive industry.

German Utility Patent G 91 10 924.8 and U.S. Pat. No. 4,376,244 generally teach directing a beam of light onto a substrate before the adhesive is applied and directing the beam of light onto the substrate after the drop of adhesive has been applied. This device monitors only the presence or absence of adhesive on the substrate and does not provide a determination if sufficient material, such as evident by its height and/or width, has been deposited. Furthermore, this device requires a reflective substrate, such as metal or veneer, and may not be suitable for all substrates, such as glass.

Beads that are continuous, but not of a sufficient height or width, may also be undesirable because the ability of the bead to act as a moisture barrier and/or the strength of the bond of the window glass to the vehicle may be affected. In like manner, beads exceeding a certain height or width may also be undesirable. Therefore, it is desirable to be able to determine not only discontinuities in the bead, but also to detect the quality, such as the height, width, etc. of the deposited bead.

SUMMARY OF THE INVENTION

It is, therefore, among the aspects of this invention to provide for the detection of gaps or discontinuities in a dispensed bead on a substrate.

It is also an aspect of one embodiment of this invention to provide for the monitoring of a bead dispensed upon a substrate to detect beads not having a desirable bead height and/or cross-section.

It is also an aspect of this invention, according to one embodiment, to provide for the monitoring of a dispensed bead and to adjust the amount of material dispensed from a dispenser as a result of said monitoring.

The foregoing and other aspects of the invention, which shall become apparent as the detailed description proceeds, are achieved by a dispensing system for monitoring the characteristics of material dispensed onto a substrate, comprising: a supply of material; a nozzle for receiving said material from said supply of material and dispensing a bead of said material onto the substrate; and a sensor for monitoring the bead of dispensed material, wherein said sensor transmits and receives sound waves around an area of the dispensed material to determine if predetermined characteristics of the bead have been met.

Other aspects of the invention which will be become apparent herein are achieved by a dispensing system which controls the flow of material onto a substrate, comprising: a nozzle for dispensing a bead of material onto the substrate; a non-contacting sensor that monitors at least one predetermined characteristic of said bead of material; and a control circuit connected to said non-contacting sensor for regulating the flow of material based upon said at least one predetermined characteristic.

Still other aspects of the invention are attained by a dispensing system, comprising: a control circuit; a nozzle for dispensing a supply of material onto a substrate in the form of a bead, wherein the flow and shape of said bead is determined by said control circuit; and a sensor connected to said control circuit for providing characteristics of said bead to said control circuit for analysis.

DESCRIPTION OF THE DRAWINGS

The following is a brief description of the drawings in which like parts may bear like reference numerals and in which:

FIG. 1 is a schematic view of the application of a bead of sealant onto the marginal edge of a windshield of a vehicle in accordance with one embodiment of the invention used in conjunction with an industrial robot;

FIG. 2 is an enlarged fragmentary portion of FIG. 1;

FIG. 3 is an enlarged cross-sectional view of the dispensed bead illustrating the transmitted and received waves from a sensor;

FIGS. 4A and 4B illustrate the transmission and reception of an ultrasonic transceiver (4A) and of a shock wave transceiver (4B);

FIG. 6 is a schematic of another portion of the control circuit for adjusting the material dispensed.

DETAILED DESCRIPTION OF THE INVENTION

Figure 5:
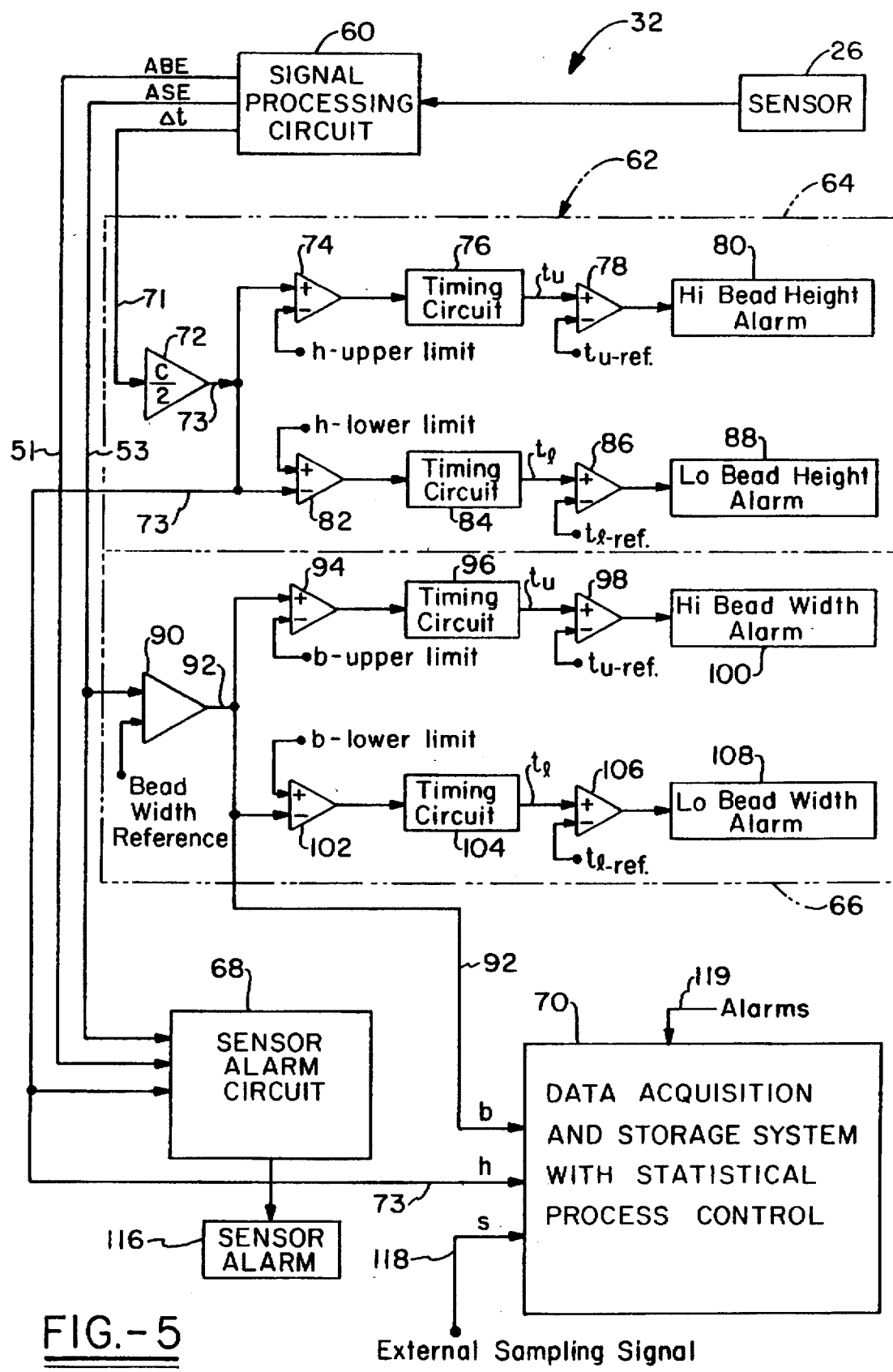
FIG. 5 is a schematic of a portion of a control circuit according to one embodiment of the invention.

With reference to FIGS. 1 and 2, there is illustrated a dispensing system, shown generally as reference numeral 10, used in conjunction with an industrial robot 12, such as, for example, the type employed in the assembly of automobiles or other vehicles. The dispensing system includes a dispenser 14 which is coupled via hose 16 to a supply of fluid material 18. The dispenser 14 includes a nozzle 20 for dispensing a bead of material 22 onto a substrate 24. The bead of material 18 may be, for example, an adhesive, a sealant, or a caulk. In one particular application, the substrate 24 may be glass, such as a windshield for use in vehicles. Furthermore, the bead 22 may be an adhesive, such as illustrated in EP 379 908, assigned to Essex Specialty Products, Inc., which is used in the assembly of automobile window glass.

Preferably, a sensor 26 for monitoring the dispensed bead 22 on the substrate, is carried by the dispenser 14. For example, the sensor 26 may be mounted to the nozzle 20 of the dispenser 14 by a clamping mechanism 28 or other suitable mounting means. The sensor 26 is coupled via cable 30 to electrical control circuitry, shown generally as reference numeral 32.

As seen in FIG. 3, the sensor 26 is a transducer for transmitting and receiving ultrasonic waves or focused shock waves. The sensor 26 is useful for measuring the distance between the sensor and an object, by generating a pressure wave and then receiving an echo as a return pressure wave after the created wave is reflected back to the sensor 26. The time interval between transmitting a pressure wave and receiving an echo or a reflected wave by the sensor 26 is a function of the distance of the bead 22 from the sensor. The time interval between the transmitted wave 34 and the return echo 36 can be electrically processed to produce a voltage signal indicative of distance of the object from the sensor 26.

An ultrasonic pulse or shock wave 34, shown generally as a plurality of parallel rays 38, is transmitted orthogonally toward the substrate 24. The individual rays or wavelets will strike either the bead 22 or the substrate 24 and, depending upon the angle of incidence, will either be reflected back toward the sensor 26 as depicted by rays 40 or will be deflected beyond the sensor's receiving range, such as illustrated by rays 42. For beads 22 having a triangular cross-section, the rays which strike an apex 44 of the bead 22 will be reflected back and received by the sensor 26 before the rays that have been reflected from the substrate 24. Furthermore, the rays 42 which strike sides 46 of the bead 22 will not be received by the sensor due to their angular orientation relative to the sensor 26. This results in two separate echoes being received by the sensor 26, one corresponding to the top or apex 44 of the bead while the other corresponds to the substrate 24. As such, the height (h) of bead 22 can be determined by the following equation:

$$h = \frac{1}{2} \Delta t \times c \tag{1}$$

Where $\Delta t$ is the time interval between receipt of the first echo from the apex 44 and the second echo from the substrate 24, and where c is the speed of sound. The ½ factor is employed to account for the propagation time of the transmitted rays 38 and the reflected rays 40.

This is further understood with reference to FIGS. 4A and 4B, wherein the sensor 26 is respectively employed to generate either an ultrasonic transmission 48a of a certain duration as associated with an ultrasonic transducer or a pulse 48b of a certain duration as associated with a shock wave transducer. The time interval between the transmission signals 48a and 48b, and corresponding return echoes 50a and 50b from the bead is noted at time t1. The return echoes 50a, 50b have an amplitude 51 of the bead echo (ABE). The time interval between the transmission signals 48a, 48b and corresponding return echoes 52a, 52b from the substrate is noted at t2. Likewise, the return echoes 52a, 52b have an amplitude 53 of the substrate echo (ASE). As such, the difference between t2 and t1 equals $\Delta t$.

To determine the base or width of a bead 22, the amplitude of the bead echo signal 50 and substrate echo signal 52 are employed. In particular, the amplitude 53 of the substrate echoes (ASE) 52a, 52b, that is the echo reflected from the substrate, is related proportionally to the area of the substrate exposed to the incident transmission or pulse 48a, 48b. The area of the substrate exposed to this transmission is inversely related to the width or base of the bead of material. In other words, less of the substrate is exposed to the transmission pulse if more of the substrate is covered with the bead 22. Therefore, the amplitude 53 of the substrate echoes (ASE) 52a, 52b is inversely related to the base of the bead. As a result, the amplitude 53 of the substrate echoes (ASE) 52a, 52b is greater with beads having a narrower base and is smaller with beads having a wider base.

Where the bead 22 has a triangular configuration, the cross-sectional area of the bead may be determined. The following equation provides a value for the area:

$$A = \frac{1}{2} (base \times height) \tag{2}$$

Where the value for the base is determined by the amplitude 53 of the substrate echo 52a, 52b, and where the height is determined by equation (1) above. Based upon the foregoing, the quality of the dispensed bead may be determined from its height, width, or cross-sectional area by repetitively transmitting a signal 48a or 48b and monitoring the corresponding return signals of the bead echo signals 50a or 50b and the corresponding substrate echo signals 52a or 52b on a dispensed bead along its length.

Furthermore, by knowing the cross-sectional area of the bead throughout its length, the volumetric output of material dispensed during a dispensing cycle, such as applying the bead 22 about the periphery of the windshield 24, may be determined and corrections made to compensate for dispensing more or less than the desired amount of material during the dispensing cycle.

Utilizing the bead height and bead base in conjunction with a feedback control loop, the flow rate of material dispensing from the nozzle 20 may be adjusted to keep the bead within the targeted constraints. If however, the bead height, width, etc., falls below or above certain predetermined levels, alarms may be activated to indicate a defective bead.

In particular, FIG. 5 illustrates a monitoring portion of the dispensing system 10 and in particular control circuit 32. The sensor 26 is preferably a capacitance type electrostatic transducer, such as manufactured by Cleveland Machine Controls, Inc. of Cleveland, Ohio, which provides reflected signals or echoes from the dispensed bead 22 and the substrate 24 which are then passed through signal processing circuitry 60 such as described generally in U.S. Pat. Nos. 4,887,248 and 4,459,526, the disclosure of each being incorporated herein by reference. The signal processing circuitry 60 determines and generates signals corresponding to the amplitude of the bead and the substrate echoes ABE, ASE, as well as Δt.

It can be seen that the sensor 26 is operatively connected to the control circuit 32. Generally, the control circuit 32 includes the signal processing circuit 60, a bead measuring system 62 which includes a bead height processing circuit 64 and a bead width processing circuit 66, a sensor alarm circuit 68 and a statistical process control circuit 70. This portion of the control circuit 32 functions to process the information generated by the sensor 26 and determines whether the bead height and bead width of the dispensing bead 22 comply with predetermined characteristics. Additionally, control circuit 32 determines whether the dispensed bead 22 conforms to a desired shape while collecting data regarding the dispensing process for subsequent analysis.

In particular, the signal processing circuit 60 receives data from sensor 26 and, as discussed previously, generates a bead echo amplitude signal 51, a substrate echo amplitude signal 53 and the corresponding time interval signal Δt which is generally represented by the numeral 71.

The time interval signal 71 is received by the bead height processing circuit 64. The bead height processing circuit 64 includes a multiplier 72 which, as discussed before, multiplies the time interval 71 by a factor of the speed of sound divided by two so as to generate an analog height signal 73. The bead height processing circuit 64 then determines whether the height signal 73 is within predetermined upper and lower limits and, if not, an alarm signal is generated. In operation, the height signal 73 is received by an upper limit comparator 74 so as to generate a difference signal that is received by a timing circuit 76. The timing circuit 76 in turn generates a signal that is received by a timing comparator 78. The timing circuit 76 determines for what period of time the bead height exceeds the upper limit defined by comparator 74. As such, momentary or non-critical excesses in bead height will not generate the alarm signal. Therefore, if the comparator 78 determines that the predetermined upper limit has been exceeded for a time greater than a predetermined period of time, an alarm 80 is activated.

In a similar fashion, the height signal 73 is received by a lower limit comparator 82. The lower limit comparator 82 generates a signal that is received by a timing circuit 84 which generates a timing signal that is received by a timing comparator 86. As before, if the height signal 73 falls below a predetermined lower limit for a time greater than a predetermined period of time, an alarm 88 is activated accordingly. Those skilled in the art will also appreciate that the height signal 73 is passed on by the bead height processing circuit 64 to the sensor alarm circuit 68 and to the statistical process control system 70.

The bead width processing circuit 66 receives the substrate echo amplitude signal 53 to determine whether the width of the bead material 22 is within predetermined upper and lower limits and, if not, an alarm signal is generated. In particular, the substrate echo signal 53 is received by a bead width multiplier/converter 90 which generates an analog base signal 92. The base signal 92 is received by a comparator 94 to check the bead width against a predetermined upper limit. The comparator 94 then generates an appropriate signal that is received by a timing circuit 96 which provides a timing signal to a timing comparator 98. If the timing comparator 98 determines that the bead base exceeds a predetermined upper limit for a time greater than a predetermined period of time, an alarm 100 is activated.

In a similar manner, the base analog signal 92 is received by a lower limit comparator 102. As before, the lower limit comparator 102 generates a signal that is received by a timing circuit 104 which generates an appropriate signal that is received by a timing comparator 106. If this signal is less than a predetermined width for a time greater than a predetermined period of time, the comparator 106 generates an appropriate signal to activate an alarm 108. The bead width processing circuit 66 also passes through the analog base signal 92 to the statistical process control circuit 70.

The sensor alarm circuit 68 is employed to perform a sensor check to ensure that the sensor 26 is functional and free from contamination. In operation, the sensor 26 is placed over a reference bead-substrate pair of fixed and known dimensions. In response to a sensor check command, circuit 68 compares incoming ABE 51, ASE 53, and bead height analog signal 73, with pre-determined reference values for the bead-substrate pair. If the incoming ABE 51, ASE 53, and bead height analog signal 73, match the predetermined reference values for the bead-substrate pair then the sensor 26 is deemed functional and free from contamination. If not, then a sensor alarm 116 is activated indicating a sensor malfunction or contamination.

As mentioned previously, the statistical process control circuit 70 receives the analog height signal 73, the analog base signal 92 and, additionally, an external sampling signal 118. It also receives all previously mentioned alarms indicated collectively as 119. Those skilled in the art will appreciate that the statistical process control circuit 70 employs the signals 73, 92, 118 and 119 to generate and store the necessary data information for analysis by quality control personnel responsible for the operation of the dispensing system 10.

Referring now to FIG. 6, it will be appreciated that the control circuit 32 also utilizes the data generated by the bead measuring system 62 within a closed loop feedback system for the dispenser system 10. In particular, this portion of the control circuit 32 includes the bead measuring system 62 and a variable flow rate controller 120. It will be appreciated then that the control circuit 32, which is connected to the sensor 26 and the material supply 18, monitors the amplitude of the sound waves reflected from the dispensed material, the amplitude of the sound waves reflected from the substrate, and a time difference between when the amplitudes of the reflected sound waves are received by the sensor so as to control the flow of the material onto the substrate.

In particular, the sensor 26 communicates with the bead measuring system 63 which, as discussed previously, generates an analog base signal 92 and an analog height signal 73. A multiplier 122 receives both the base signal 92 and height signal 73 and multiplies them so as to generate an area signal 124. The area signal 124 is then received by a cross sectional area comparator 126 which determines the difference between a desired target cross Sectional area and the actual value of the bead material cross sectional area and generates a correction signal 128 that is received by the variable flow rate controller 120. In a similar manner, the analog base signal 92 is received by a bead base target comparator 130. The comparator 130 generates a base correction signal 132 which provides the difference between the measured base signal and the desired target value of the base signal to the variable flow rate controller 120. Finally, the analog height signal 73 is received by a bead height target comparator 134. Based upon the difference between the measured height signal 73 and the desired height target, the comparator 134 generates a height correction signal 136 that is also received by the variable flow rate controller 120.

Based upon the correction signals 128, 132 and 136 received by the variable flow rate controller 120, corresponding correction signals are sent to either the material supply 18 or to the dispenser 14 so as to adjust the shape and configuration of the material bead 22. Those skilled in the art will appreciate that the dispenser 14 could be a variable orifice gun which controls the manner in which the material is dispensed from the dispenser 14 so as to control the shape of the bead or that the variable flow rate controller 120 could control a variable speed gear pump communicative with the material supply 18 so as to control the amount of material flow onto the substrate.

Based upon the foregoing discussion of the structure and operation of the dispensing system 10, it should be apparent that the dispensing system provides numerous advantages over the prior art. In particular, the present invention provides the advantage of an on-line bead measurement and control system using a sensor that does not come in contact with the measured material. This invention allows the dispensing system 10 to automatically correct any malfunctions within the dispensing system so as to ensure the smooth operation of the assembly line. Additionally, the bead measurement and control system employed allows for an alarm system that indicates when the dispensed bead does not conform to the requirements of the assembly process. This further allows the nonconforming bead to be easily identified and reworked so as to minimize machine down time and manufacturing costs. Yet another advantage of the alarm system is that if the upper or lower bead height and base limits are only exceeded for less than a predetermined period of time, the alarms are not activated. As such, the dispensing system disclosed is sensitive enough to disregard minor inconsistencies in the shape of the bead material. It will be appreciated that the predetermined periods of time can be adjusted as required by particular dispensing applications.

A further advantage of the present dispensing system is that real time measurements can be taken of the bead height and bead base dimensions so as to provide statistical process control information to the appropriate personnel in the manufacturing facility. This allows manufacturing engineers to determine the characteristics of various materials, substrates, sensors, and dispensing devices used in the manufacturing operation.

Thus, it can be seen that the objects of the invention have been satisfied by the structure presented above. It should be apparent to those skilled in the art that the objects of the present invention could be practiced with a wide variety of materials and substrates as required.

While only the best mode and preferred embodiment of the invention has been presented and described in detail, it will be understood that the invention is not limited thereto or thereby. Accordingly, for an appreciation of the true scope and breadth of the invention, reference should be made to the following claims.

What is claimed is:

1. A dispensing system which controls the flow of material onto a substrate, comprising:

a nozzle for dispensing a substantially triangular bead of material onto a substrate;

an utltrasonic sensor that monitors predetermined characteristics of said substantially triangular bead of material by emitting sound waves normal to the substrate and receiving substantially normal reflected sound waves from only an apex of said substantially triangular bead and said substrate; and a control circuit connected to said ultrasonic sensor for regulating the flow of material based upon said predetermined characteristics, wherein said ultrasonic sensor is carried by said nozzle in such a manner that said control circuit generates and monitors a height value of an apex of said substantially triangular bead, a base value of said substantially triangular bead, and a corresponding area value of said substantially triangular bead wherein said control circuit is employed to control the height and base of said substantially triangular bead of material depending upon said base, height and area signals.

2. The dispensing system according to claim 1, further comprising:

a height comparator for comparing said height value to a desired height value and generating a corresponding height correction signal;

a base comparator for comparing said base value to a desired base value and generating a corresponding base correction signal;

an area comparator for comparing said area value to a desired area value and generating a corresponding area correction signal; and a variable flow rate controller for receiving said height correction signal, said base correction signal and said area correction signal, wherein said variable flow rate controller adjusts the shape of said substantially triangular bead of material based upon any one of said height, base and area correction signals.

3. The dispensing system according to claim 1 wherein said ultrasonic sensor transmits a pulse wave onto the substrate with said substantially triangular bead and wherein said ultrasonic sensor receives a reflection of said sound waves from said apex in the form of a bead echo amplitude signal and said substrate a substrate echo amplitude signal.

4. The dispensing system according to claim 3 wherein the height of said bead of material is determined by measuring the time difference between when said bead echo amplitude signal and said substrate echo amplitude signal are received by said ultrasonic sensor, and multiplying this time difference by an appropriate factor.

5. The dispensing system according to claim 3, wherein the width of said bead of material is determined by measuring the amplitude of said substrate echo amplitude signal and multiplying by an appropriate factor.

6. A dispensing system, comprising:

a control circuit;

a nozzle for dispensing a supply of material onto a substrate in the form of a substantially triangular bead, wherein the flow and substantially triangular shape of said bead is determined by said control circuit; and a shock wave sensor connected to said control circuit and attached to said nozzle for providing predetermined characteristics of said bead to said control circuit for analysis wherein said shock wave sensor transmits pulses normal to said bead and said substrate and receives normal reflected pulses from only an apex of said substantially triangular bead and from said substrate in return.

7. The dispensing system according to claim 6, wherein said control circuit comprises:

a signal processing circuit for receiving said reflected pulses and generating a bead echo amplitude signal from said apex, a substrate echo amplitude signal from said substrate and a time difference signal corresponding to the time period between when said bead echo amplitude signal and said substrate echo amplitude signal are generated;

a bead measuring system for receiving said substrate echo amplitude signal and said time difference signal and generating a corresponding bead height signal and a corresponding bead width signal; and an echo amplitude circuit for receiving said bead echo amplitude signal and said substrate echo amplitude signal to ensure that said sensor is functional and free from contamination.

8. The dispensing system according to claim 7, wherein said bead measuring system activates an alarm whenever one of said bead height signal and said bead width signal exceeds corresponding predetermined ranges for corresponding predetermined periods of time.

9. The dispensing system according to claim 8, wherein said control circuit further comprises:

a multiplier for multiplying said bead height value by said bead width value to generate an area value;

a height comparator for comparing said height value to a desired height value and generating a corresponding height correction signal;

a bead width comparator for comparing said bead width value to a desired bead width value and generating a corresponding bead width correction signal;

an area comparator for comparing said area value to a desired area value and generating a corresponding area correction signal; and a variable correction signal, said bead width correction signal and said area correction signal, wherein said variable flow rate controller adjusts the shape of said bead of material based upon any one of said height correction signal, bead width correction signal and said area correction signal.

10. The dispensing system according to claim 8, wherein said control circuit further comprises:

a statistical process control circuit which receives said bead width value, said height value and an external sampling signal for analysis.

11. A dispensing system for monitoring the characteristics of a predetermined geometric shape bead of material dispensed onto a substrate, comprising:

a supply of material;

a nozzle for receiving said material from said supply of material and dispensing a predetermined geometric shaped bead of said material onto the substrate; and an acoustic sensor for monitoring the geometric shape bead of dispensed material in a single direction, wherein said acoustic sensor transmits sound waves normal to the substrate and receives substantially normal reflected sound waves from only an apex of the geometric shape bead of material and the substrate to determine if predetermined characteristics of the geometric shape bead have been met.

12. The dispensing system according to claim 11, further comprising a control circuit connected to said sensor, wherein said control circuit monitors an amplitude of the sound waves reflected from only the apex of the geometric shape bead of dispensed material and the substrate and determines a time difference between when the amplitude of respective reflected sound waves are received by said acoustic sensor and accordingly controls the flow of said material onto the substrate, and wherein said control circuit confirms the shape of the geometric shape bead from the amplitudes of the reflected sound waves and the time difference therebetween.

13. The dispensing system according to claim 12, wherein said control circuit comprises:

a signal processing circuit connected to said acoustic sensor for generating said time difference and a substrate echo amplitude signal; and a bead height and width processing circuit for comparing said time difference and said substrate echo amplitude signal to corresponding predetermined ranges and activating an appropriate alarm if one of said time difference and said substrate echo signals are not within said predetermined ranges.

14. The dispensing system according to claim 13, wherein said signal processing circuit generates a bead echo amplitude signal, and wherein an echo amplitude processing circuit receives both said substrate echo amplitude signal and said bead echo amplitude signal to ensure that said sensor is functional and free from contamination.

15. The dispensing system according to claim 14, wherein said bead height and width processing circuit generates a height value and a base value for the geometric shape bead of dispensed material which are received by a statistical process control circuit for data storage and analysis.

16. The dispensing system according to claim 15, wherein said control circuit further comprises:

a multiplier for receiving said height value and said base value for calculating an area value, and wherein said height value, said base value and said area value are compared against respective target values so as to generate respective correction signals; and a variable flow rate controller to control the dispensing of said material.

* * * * *